United States Patent
Chuang et al.

(10) Patent No.: US 11,563,375 B2
(45) Date of Patent: Jan. 24, 2023

(54) METHOD AND SCHEME CAPABLE OF MITIGATING EFFECT CAUSED BY OCCURRENCE OF UNEXPECTED MAGNETIC FIELD/COUPLING FOR DC/DC POWER CONVERTER

(71) Applicant: Audiowise Technology Inc., Hsinchu (TW)

(72) Inventors: Chia-So Chuang, Hsinchu (TW); Kuei-Ju Chiang, Hsinchu (TW); Pin-Hsuan Huang, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 40 days.

(21) Appl. No.: 17/165,888

(22) Filed: Feb. 2, 2021

(65) Prior Publication Data
US 2022/0247309 A1 Aug. 4, 2022

(51) Int. Cl.
*H02M 3/158* (2006.01)
*H02M 1/14* (2006.01)
*H02M 1/44* (2007.01)

(52) U.S. Cl.
CPC .............. *H02M 3/158* (2013.01); *H02M 1/14* (2013.01); *H02M 1/44* (2013.01)

(58) Field of Classification Search
CPC .......................................... H02M 3/155–1588
See application file for complete search history.

(56) References Cited

U.S. PATENT DOCUMENTS

| | | | |
|---|---|---|---|
| 6,188,206 B1* | 2/2001 | Nguyen | H02M 3/1588 323/283 |
| 9,391,517 B1* | 7/2016 | Pazhayaveetil | G01R 27/2611 |
| 2005/0017703 A1* | 1/2005 | Walters | H02M 3/156 323/288 |
| 2016/0036324 A1* | 2/2016 | Hofmann | H02M 1/14 315/210 |

* cited by examiner

Primary Examiner — Peter M Novak
(74) Attorney, Agent, or Firm — Winston Hsu (57) ABSTRACT

A method of a DC-to-DC (DC/DC) power converter includes: providing the DC/DC power converter having a switching node and an output sensing node, the switching node is used to be coupled to a first end of an inductive element which is externally connected to the DC/DC power converter, the output sensing node is used to be coupled to a second end of the inductive element, and an output voltage provided by the DC/DC power converter is generated at the second end of the inductive element through the inductive element; and, adjusting a switching frequency employed by the DC-to-DC power converter in response to a specific event that a ripple range of a current flowing through the inductive element reaches or exceeds above a specific range, wherein the specific event is detected by the DC/DC power converter via the switching node and the output sensing node.

18 Claims, 6 Drawing Sheets

METHOD AND SCHEME CAPABLE OF MITIGATING EFFECT CAUSED BY OCCURRENCE OF UNEXPECTED MAGNETIC FIELD/COUPLING FOR DC/DC POWER CONVERTER

BACKGROUND OF THE INVENTION

1. Field of the Invention

The invention relates to a scheme of a DC-to-DC (DC/DC) power converter, and more particularly to a method of the DC/DC power converter, a converter circuit of the DC/DC power converter, and a PWM controller in the converter circuit of the DC/DC power converter.

2. Description of the Prior Art

Generally speaking, under the trend of making true wireless stereo (TWS) devices such as earphones, earbuds, or smaller headphones (i.e. under the trend of providing miniaturized TWS devices), an unexpected or undesired magnetic field or coupling may frequently occur due to that the distance between the magnet and the inductor of a power converter in the TWS device becomes much shorter because of the smaller or miniaturized size. This inevitably causes the inductance of such inductor to change or vary significantly and rapidly. As the circuit response time of the power converter is much longer, the output voltage provided by the power converter will drop down significantly and also the average current provided by the power converter will be reduced.

SUMMARY OF THE INVENTION

Therefore one of the objectives of the invention is to provide a method of a DC-to-DC (DC/DC) power converter, the DC/DC power converter, and a PWM controller in a converter circuit of the DC/DC power converter, to solve the above-mentioned problems.

According to embodiments of the invention, a method of a DC-to-DC (DC/DC) power converter is disclosed. The method includes providing the DC/DC power converter having a switching node and an output sensing node. The switching node is used to be coupled to a first end of an inductive element which is externally connected to the DC/DC power converter. The output sensing node is used to be coupled to a second end of the inductive element. An output voltage provided by the DC/DC power converter is generated at the second end of the inductive element through the inductive element. The method further includes adjusting a switching frequency employed by the DC-to-DC power converter in response to a specific event that a ripple range of a current flowing through the inductive element reaches or exceeds above a specific range. The specific event is detected by the DC/DC power converter via the switching node and the output sensing node.

According to the embodiments of the invention, a converter circuit of a DC-to-DC (DC/DC) power converter is disclosed. The converter circuit comprises a switching node, an output sensing node, and a pulse-width-modulation (PWM) controller. The switching node is used to be coupled to a first end of an inductive element which is externally connected to the DC/DC power converter. The output sensing node is used to be coupled to a second end of the inductive element. An output voltage provided by the DC/DC power converter is generated at the second end of the inductive element through the inductive element. The PWM controller is coupled to the switching node and the output sensing node, and it is used for adjusting a switching frequency in response to a specific event that a ripple range of a current flowing through the inductive element reaches or exceeds above a specific range, wherein the specific event is detected by the PWM controller via the switching node and the output sensing node.

According to the embodiments of the invention, a PWM controller which can be applied in a converter circuit of a DC-to-DC (DC/DC) power converter is disclosed. The converter circuit comprises a switching node and an output sensing node. The switching node is used to be coupled to a first end of an inductive element which is externally connected to the DC/DC power converter. The output sensing node is used to be coupled to a second end of the inductive element. An output voltage provided by the DC/DC power converter is generated at the second end of the inductive element through the inductive element. The PWM controller is coupled to the switching node and the output sensing node and is used for adjusting a switching frequency in response to a specific event that a ripple range of a current flowing through the inductive element reaches or exceeds above a specific range, wherein the specific event is detected by the PWM controller via the switching node and the output sensing node.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. Tisa diagram showing the performance comparison examples of the PWM controller operating without and with mitigating the unexpected magnetic coupling.

DETAILED DESCRIPTION

The invention aims at providing a technical solution of a power recovery method/scheme against magnetic coupling effect, which is capable of mitigating or avoiding a voltage drop of an output voltage level generated from a power converter due to unexpected magnetic coupling's occurrence based on a much shorter circuit response time.

Figure 1:
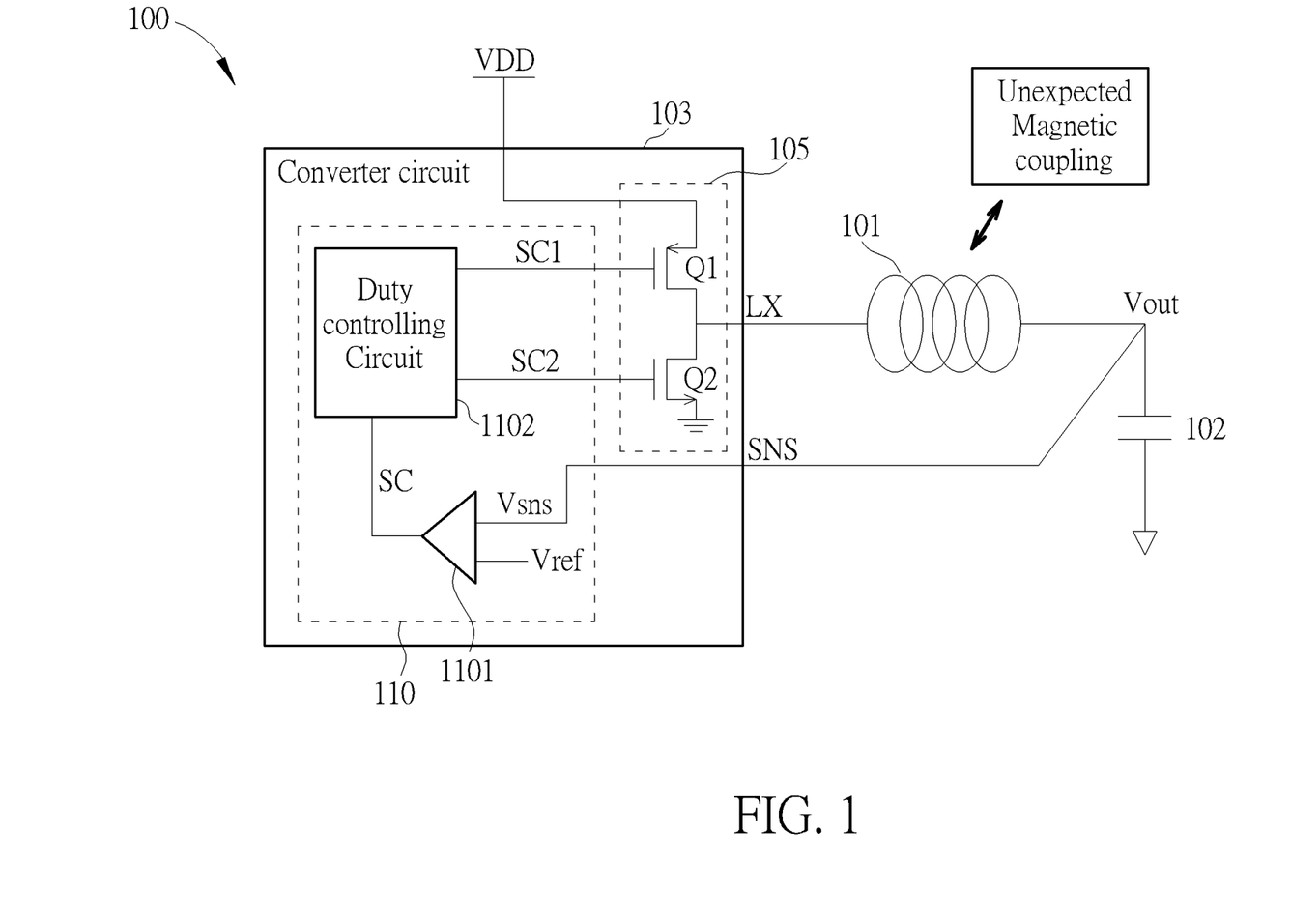
FIG. 1 is a block diagram of a DC-to-DC (DC/DC) power converter according to an embodiment of the invention.

FIG. 1 is a block diagram of a DC-to-DC (DC/DC) power converter 100 according to an embodiment of the invention. The power converter 100 for example is a buck converter (but not limited) and is coupled to a supply voltage signal VDD to step down from an input voltage level such as the supply voltage signal VDD to its output such as the output voltage Vout as shown in FIG. 1. The power converter 100 comprises an inductive element 101, a capacitive element 102, and a converter circuit 103 wherein the inductive element 101, capacitive element 102, and converter circuit 103 may be implemented and installed on the same print circuit board (PCB) or different boards; however, this is not meant to be a limitation. The converter circuit 103 comprises a switching node LX, an output sensing node SNS, a switching circuit 105, and a pulse-width-modulation (PWM) controller 110. The converter circuit 103 is externally coupled to the inductive element 101 via the switching node LX. The switching node LX is used to be coupled to a first end of the inductive element. The inductive element 101 is coupled between the switching node LX and a first end of the capacitive element 102 wherein a second end of the capacitive element 102 is coupled to the ground level. The first end of the capacitive element 102 is connected to a second end of the inductive element 101 and is also connected to the output sensing node SNS of the converter circuit 103 of the power converter 100, and the output sensing node SNS is used to be coupled to the second end of the inductive element 101, as shown in FIG. 1. The output voltage Vout (provide by the DC/Dc power converter 100) is generated at the first end of the capacitive element 102 (or at the second end of the inductive element 101), and the capacitive element 102 and inductive element 101 may be regarded as a load capacitance and a load inductance respectively.

In practice, the switching circuit 105 may comprise a first transistor Q1 such as a PMOS transistor and a second transistor Q2 such as a NMOS transistor wherein the first transistor Q1 is coupled between the supply voltage signal VDD and the switching node LX while the second transistor Q2 is coupled between the ground level and the switching node LX; however, the circuit design of the switching circuit 105 is not meant to be a limitation. The PWM controller 110 is coupled to the switching node LX via the switching circuit 105 and coupled to the output sensing node SNS, and it for example is arranged to control ON/OFF states (or conductance) of the transistors Q1 and Q2. For instance, the PWM controller 110 may comprise an operational amplifier 1101 and a duty controlling circuit 1102. The operational amplifier 1101 is used as an error amplifier to receive and compare a reference voltage level Vref with the sensed voltage Vsns at the output sensing node SNS to generate a control signal SC to the duty controlling circuit 1102. The duty controlling circuit 1102 is arranged to control and adjust the duty cycle of a PWM control signal used for controlling the transistors Q1 and Q2 according to the control signals SC1 and SC2. However, this is not meant to be a limitation.

Figure 2:
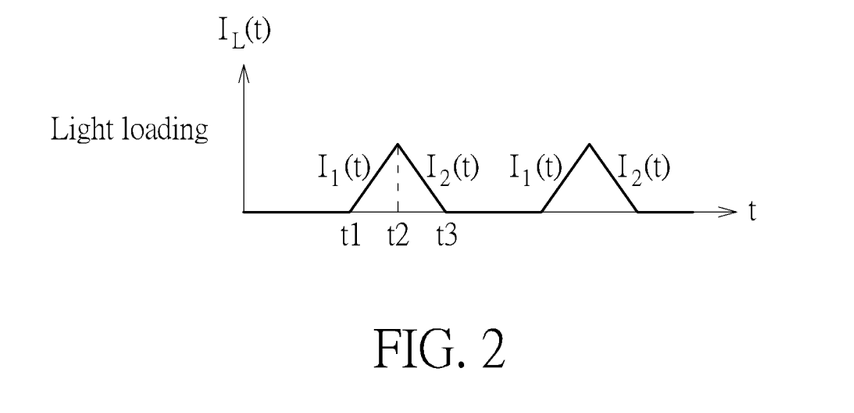
FIG. 2 is a diagram showing a normal signal waveform of the inductor current $I_L(t)$ passing through the inductive element when the power converter operates in a discontinuous conduction mode (DCM) according to an embodiment of the invention.

FIG. 2 is a diagram showing a normal signal waveform of the inductor current $I_L(t)$ passing through the inductive element 101 when the power converter 100 operates in a discontinuous conduction mode (DCM) according to an embodiment of the invention. The increase and decrease of the inductor current $I_L(t)$ can be indicated by the following equations:

$$\frac{VDD - V_{sns}}{L} = \frac{dI_1(t)}{dt}$$

$$\frac{0 - V_{sns}}{L} = \frac{dI_2(t)}{dt}$$

As shown in FIG. 1, during the period between time t1 and time t2, in the DCM mode of the power converter 100, the PWM controller 110 for example turns on the transistor Q1 and turn off the transistor Q2, and the inductor current $I_L(t)$ passes through the inductive element 101 from the supply voltage VDD to the first end of the capacitive element 102. In this situation, the PWM controller 110 detects the output sensing voltage Vsns to control the conductance of the transistor Q1 so that the inductor current $I_L(t)$ indicated by $I_1(t)$ increases with time based on a first slope $$\frac{dI_1(t)}{dt}$$

and stops at the maximum current value when the output sensing voltage Vsns reaches the supply voltage VDD. Then, during the period between time t2 and time t3, the PWM controller 110 turns off the transistor Q1 and turns on the transistor Q2, and accordingly the inductor current $I_L(t)$ passes through the inductive element 101 from the first end of the capacitive element 102 to the ground level. In this situation, the PWM controller 110 detects the output sensing voltage Vsns to control the conductance of the transistor Q2 so that the inductor current $I_L(t)$ indicated by $I_2(t)$ decreases with time based on a second slope $$\frac{dI_2(t)}{dt}$$

and stops at zero (i.e. zero crossing) when the output sensing voltage Vsns reaches the ground level.

Figure 3:
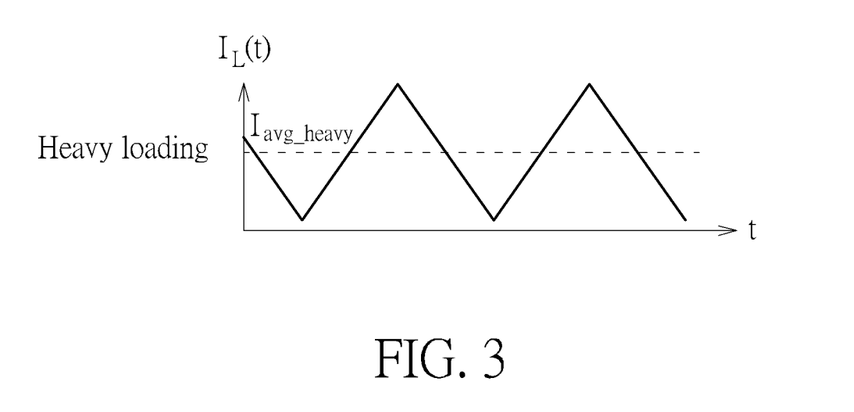
FIG. 3 is a diagram showing the signal waveform of the inductive current $I_L(t)$ of the power converter operating under a heavy loading condition according to embodiments of the invention.
Figure 4:
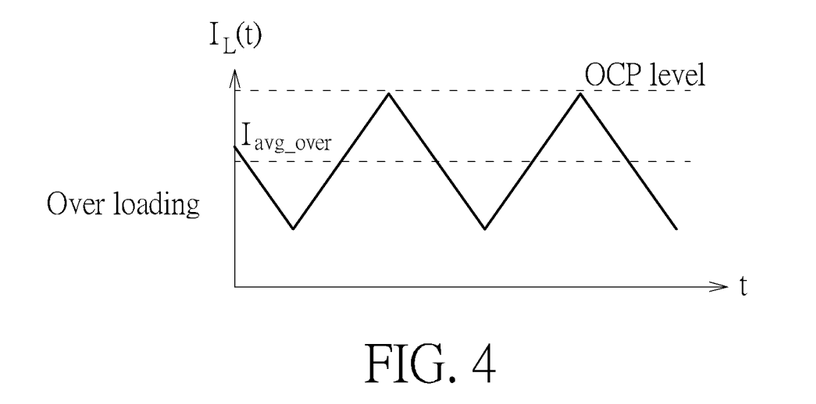
FIG. 4 is a diagram showing the signal waveforms of the inductive current $I_L(t)$ of the power converter operating under an over loading condition according to embodiments of the invention.

The power converter 100 may operate at the DCM mode if it is under a light loading condition, and the power converter 100 may operate at a continuous conduction mode (CCM) if it is under a heavy loading condition or an over loading condition. FIG. 3 and FIG. 4 are diagrams respectively showing signal waveforms of the inductive current $I_L(t)$ of the power converter 100 operating under a heavy loading condition and an over loading condition according to embodiments of the invention. As shown in FIG. 3, when the power converter 100 is under the heavy loading condition, the power converter 100 may operate at a continuous conduction mode (CCM) and the inductive current $I_L(t)$ for example is shown on FIG. 3 wherein the minimum value of the inductive current $I_L(t)$ does not reach zero, i.e. no zero crossing (ZC) occurs. Iavg heavy means the average value of the inductive current $I_L(t)$ when the power converter 100 is under the heavy loading condition. Further, as shown in FIG. 4, when the power converter 100 is under the over loading condition, the power converter 100 may also operate at the CCM mode and the inductive current $I_L(t)$ for example is shown on FIG. 4 wherein the minimum value of the inductive current $I_L(t)$ does not reach zero, i.e. no zero crossing (ZC) occurs, and the maximum value of the inductive current $I_L(t)$ may reach the maximum acceptable current level specified by the OCP operation, i.e. the OCP level. Iavg over means the average value of the inductive current $I_L(t)$ when the power converter 100 is under the over loading condition.

Refer to FIG. 1 again. If an unexpected event of magnetic coupling occurs, then the inductance of such inductive element 101 may be increased or decreased due to the unexpected magnetic coupling. Based on the above-mentioned equations, the increase of the inductance of the inductive element 101 will make the absolute value of $$\frac{dI_1(t)}{dt}$$

and the absolute value of $$\frac{dI_2(t)}{dt}$$

become smaller, and this indicates that in this situation the inductive current $I_1(t)$ increases slowly with a flatter slope and then the inductive current $I_2(t)$ decreases slowly with another flatter slope. Instead, the decrease of the inductance of the inductive element 101 will make the absolute value of $$\frac{dI_1(t)}{dt}$$

and the absolute value of $$\frac{dI_2(t)}{dt}$$

become larger, and this indicates that in this situation the inductive current $I_1(t)$ increases rapidly with a sharper slope and then the inductive current $I_2(t)$ decreases rapidly with another sharper slope. When the inductance increases, it is possible that the duty is settled after cycles. When the inductance decreases, it is possible that the over current protection (OCP) operation is triggered to make the capacitance of capacitive element 102 become smaller.

Figure 5:
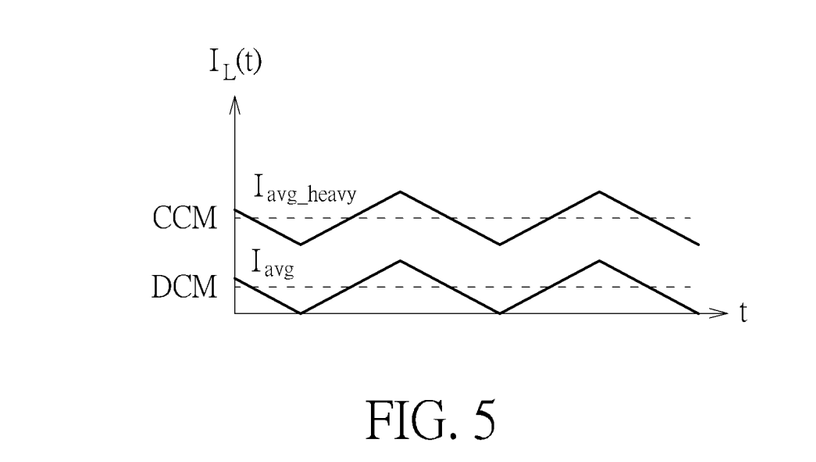
FIG. 5 is a diagram showing an example of the signal waveform of the inductive current $I_L(t)$ of the power converter when the inductance of the inductive element increases due to the event of unexpected magnetic coupling.
Figure 6:
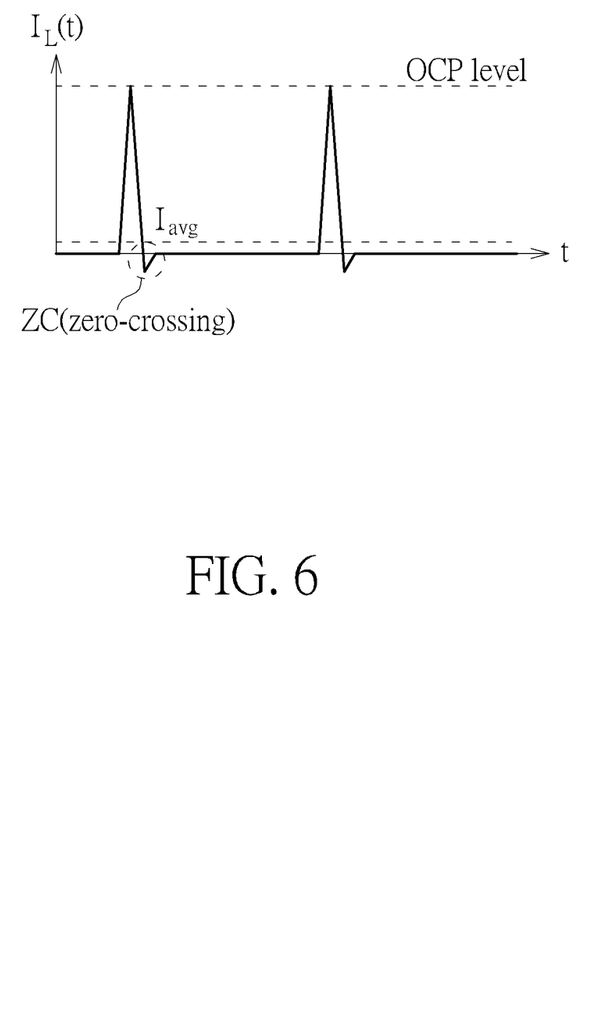
FIG. 6 is a diagram showing an example of the signal waveform of the inductive current $I_L(t)$ of the power converter when the inductance of the inductive element decreases due to the event of unexpected magnetic coupling.

FIG. 5 and FIG. 6 are diagrams respectively showing examples of signal waveforms of the inductive current $I_L(t)$ of the power converter 100 when the inductance of the inductive element 101 increases or decreases due to the event of unexpected magnetic coupling. As shown in FIG. 5, when the inductance of the inductive element 101 increases due to the unexpected magnetic coupling, the slope of the current change of the inductive current IL(t) becomes much flatter no matter if the power converter 100 operates in the DCM mode or in the CCM mode. For instance, $I_{avg}$ indicates the average of the inductive current $I_L(t)$ which varies slowly when the power converter 100 operates at the DCM mode. $I_{avg\_heavy}$ indicates the average of the inductive current $I_L(t)$ which also varies slowly when the power converter 100 operates at the CCM mode. Further, as shown in FIG. 6, when the inductance of the inductive element 101 decreases due to the unexpected magnetic coupling, the slope of the current change of the inductive current $I_L(t)$ becomes much sharper. The maximum current of the inductive current $I_L(t)$ more rapidly reaches the maximum acceptable current level (i.e. OCP level) of the OCP operation (i.e. the OCP operation may be triggered) and/or then the zero crossing may instantly occur when the inductive current $I_L(t)$ more rapidly decreases. In FIG. 6, since the inductive current $I_L(t)$ more rapidly reaches the OCP level and then rapidly reaches zero, the average $I_{avg}$ of the inductive current $I_L(t)$ is reduced or decreased down. In addition, a big voltage drop of the output voltage Vout may be caused by the unexpected magnetic coupling.

In the embodiments, to avoid or mitigate the voltage drop generated due to unexpected magnetic coupling and/or to maximize or increase the reduced average current caused due to the unexpected magnetic coupling, the PWM controller 110 of the power converter 100 is used for dynamically adjusting a switching frequency (i.e. the above-mentioned clock rate) in response to a specific event that a ripple range of the current flowing through the inductive element 101, i.e. the inductive current $I_L(t)$, reaches or exceeds above a specific range. That is, the switching frequency (or clock rate) is adjusted in response to a change of the inductance of the inductive element 101 due to a change of external magnetic field. In addition, the specific event can be detected by the PWM controller 110 via the switching node LX and the output sensing node SNS. For example, the PWM controller 110 can detect the ripple range of the inductive current $I_L(t)$ by detecting the voltages/currents at the switching node LX and the output sensing node SNS so as to detect or determine whether the OCP operation is triggered/activated and/or whether zero crossing occurs, and thereby the PWM controller 110 can detect or determine whether the inductance of the inductive element 101 is changed due to the unexpected magnetic coupling.

For example, the PWM controller 110 can determine that the ripple range of the inductive current $I_L(t)$ reaches or exceeds above the specific range when detecting that a peak-to-peak value of the ripple of the inductive current $I_L(t)$ is greater than a specific threshold. The specific range is a specific range of current level which is specified by a first value such as $I_{high}$ and a second value $I_{low}$ which is lower than the first value; the first value $I_{high}$ is determined as either a maximum acceptable current level (i.e. OCP level) of the OCP operation or a tolerable current upper limit which is lower than the OCP level. The second value $I_{low}$ is determined as either zero or a tolerable current lower limit higher than zero. That is, the PWM controller 110 can earlier adjust the clock rate even though the inductive current $I_L(t)$ rapidly increases but does not yet reach the OCP level or the inductive current $I_L(t)$ rapidly decreases but does not yet reach the zero level.

The PWM controller 110 is arranged to adjust the switching frequency when both of a first event and a second event occur during a same duty cycle (or during different duty cycles) of the DC/DC power converter 100. The first event indicates that the inductive current $I_L(t)$ reaches the first value $I_{high}$ mentioned above, and the second event indicates that the inductive current $I_L(t)$ reaches the second value $I_{low}$ mentioned above.

Figure 7:
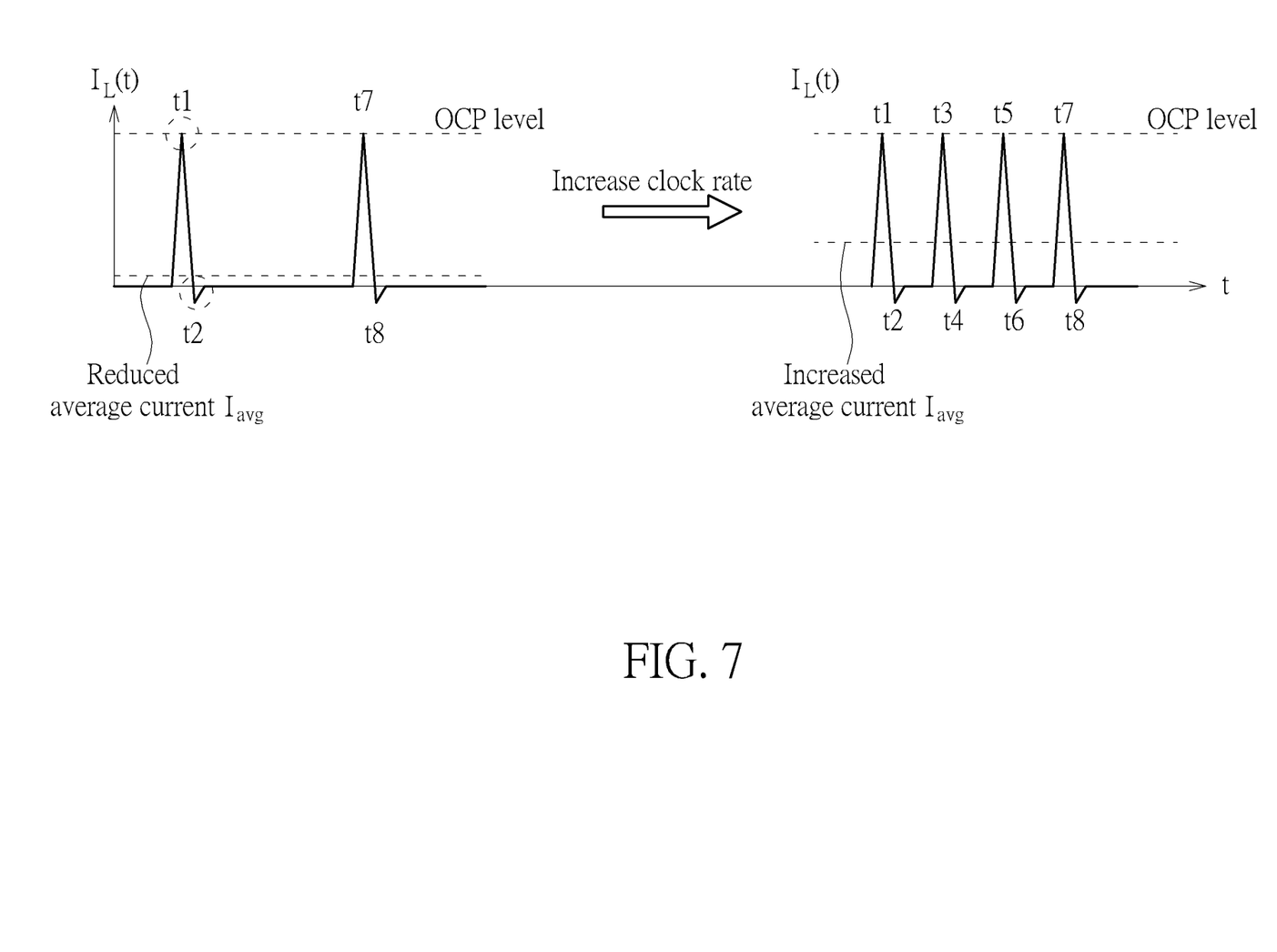

FIG. 7 is a diagram showing the performance comparison examples of the PWM controller 110 operating without and with mitigating the unexpected magnetic coupling. For example, as shown in left half of FIG. 7, if the PWM controller 110 is not arranged to mitigate the unexpected magnetic coupling, then the current value of inductive current $I_L(t)$ rapidly increase and reaches the OCP level (i.e. the maximum acceptable current level) at time t1 since the OCP operation is triggered and then the current value of inductive current $I_L(t)$ rapidly decrease and reaches zero (i.e. zero crossing) at time t2. Then, for the second time, similarly, the current value of inductive current $I_L(t)$ rapidly increase and reaches the OCP level (i.e. the maximum acceptable current level) at time t7 since the OCP operation is triggered and then the current value of inductive current $I_L(t)$ rapidly decrease and reaches zero (i.e. zero crossing) at time t8. Thus, the average current $I_{avg}$ of the inductive current $I_L(t)$ is reduced due to the effect of unexpected magnetic coupling.

Instead, as shown in the right half of FIG. 7, the PWM controller 110 is arranged to mitigate the effect of the unexpected magnetic coupling. In this example, the first value $I_{high}$ means the OCP level, and the second value $I_{low}$ means the zero level; however, this is not intended to be a limitation. The PWM controller 110 may detect the first event that the current value of inductive current $I_L(t)$ rapidly increase and reaches the first value $I_{high}$ (the OCP level, i.e. the maximum acceptable current level) by detecting that the OCP operation is triggered at time t1 and then may detect the second event that current value of inductive current $I_L(t)$ rapidly decrease and reaches the second value $I_{low}$ (zero) by detecting the occurrence of zero crossing at time t2. The time t1 and time t2 may occur in the same duty cycle (i.e. in the same period of a PWM control signal) or in different duty cycles (i.e. in the different periods of different PWM control signals). This is not intended to be a limitation of the invention. In the embodiment, when detecting the occurrences of the first and second events, the PWM controller 110 is arranged to instantly increase the clock rate of the PWM control signal generated from the PWM controller 110. Accordingly, by increasing the clock rate, the inductive current $I_L(t)$ can be induced and generated more frequently. For example, during the period from time t1 to time t7, the inductive current $I_L(t)$ may be induced and generated for two times (but not limited), and the current value of the inductive current $I_L(t)$ may reach the OCP level at time t3 and time t5 and may reach zero at time t4 and time t6. Accordingly, the average current $I_{avg}$ of the inductive current $I_L(t)$ can be significantly increased and enhanced or maximized.

Further, in other embodiments, the PWM controller 110 may determine increasing the clock rate when at least one of the first and second events occurs. For example, if either the first event or the second event occurs, the PWM controller 110 may determine that the inductance of the inductive element 101 is changed due to the event of an unexpected magnetic coupling and then determine to increase the clock rate to mitigate the effect of the unexpected magnetic coupling. If detecting that none of the first and second events occurs, the PWM controller 110 is arranged to keep the clock rate at an original clock rate/frequency. Further, when detecting that the first event and/or second event occurs, the PWM controller 110 may adjust the clock rate to be higher gradually, consecutively, or step by step. In addition, the PWM controller 110 may adjust the clock rate to be higher and keep the adjusted clock rate during a specific time period and then determines whether to adjust the clock rate again. Further, the PWM controller 110 may raise/increase the switching frequency (i.e. the clock rate) during a predetermined time period or during a variable time period which ends at a timing when detecting that the ripple range of the inductive current $I_L(t)$ becomes smaller than the specific range of current level. The PWM controller 110 may be arranged to adjust the switching frequency to an original frequency from an increased frequency when the predetermined time period or the variable time period ends. All the modifications fall within the scope of the invention.

Figure 8:
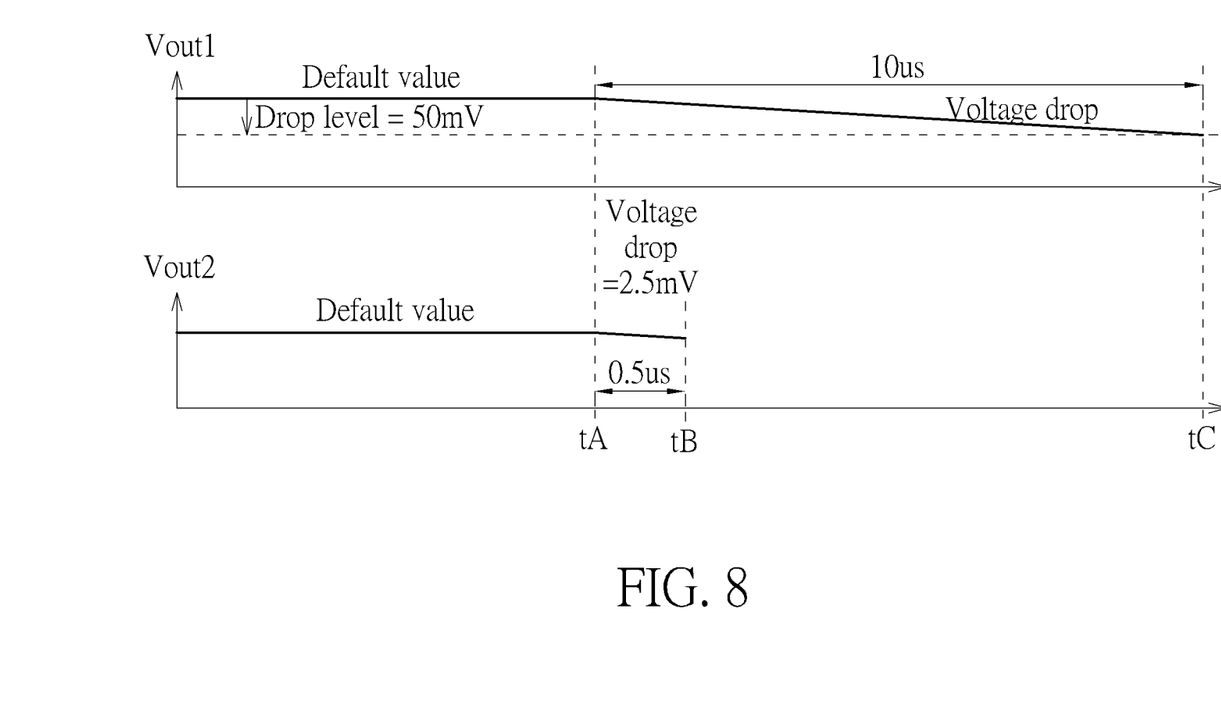
FIG. 8 is a diagram showing an example of the performance comparison for the PWM controller with mitigating the effect of unexpected magnetic coupling according to an embodiment of the invention.

FIG. 8 is a diagram showing an example of the performance comparison for the PWM controller 110 with mitigating the effect of unexpected magnetic coupling according to an embodiment of the invention. As shown in the top part of FIG. 8, Vout1 indicates the output voltage generated from the DC/DC power converter 100 if the DC/DC power converter 100 does not mitigate the effect of unexpected magnetic coupling. The output voltage Vout1 can be kept at a default voltage level before time tA. At time tA, the unexpected magnetic coupling occurs, and thus a significant voltage drop such as 50 millivolts (mV) (but not limited) occurs at the output voltage Vout1 and the circuit response time of the power converter 100 may be a much longer time period such as 10 microseconds (μs) if the load capacitance is 10 microfarads (μF); however, this is not intended to be a limitation. When the DC/DC power converter 100 employs the operation of mitigating the effect of unexpected magnetic coupling, as shown in the bottom part of FIG. 8, Vout2 indicates the output voltage generated from the DC/DC power converter 100 using the operation of mitigating the effect of unexpected magnetic coupling. Similarly, the output voltage Vout2 can be also kept at the default voltage level before time tA. Also, at time tA, the unexpected magnetic coupling occurs, and only a slight voltage drop such as 2.5 mV (but not limited) occurs at the output voltage Vout2 and the circuit response time of the power converter 100 can be reduced to a much shorter time period such as 0.5 μs which is less than half of the period of the PWM control signal if the load capacitance is the same and identical to 10 μF. Accordingly, from FIG. 8, the PWM controller 110 with the operation/capability of mitigating the effect of unexpected magnetic coupling can significantly reduce the circuit response time and significantly reduce or avoid the voltage drop of the output voltage, to still provide enough power for an electronic device even though the undesired and unexpected magnetic coupling occurs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of a DC-to-DC (DC/DC) power converter, comprising:
   providing the DC/DC power converter having a switching node and an output sensing node, the switching node is used to be coupled to a first end of an inductive element which is externally connected to the DC/DC power converter, the output sensing node is used to be coupled to a second end of the inductive element, and an output voltage provided by the DC/DC power converter is generated at the second end of the inductive element through the inductive element; and
   adjusting a switching frequency employed by the DC-to-DC power converter in response to a specific event that a ripple range of a current flowing through the inductive element reaches or exceeds above a specific range, wherein the specific event is detected by the DC/DC power converter via the switching node and the output sensing node;
   wherein the adjusting step comprises:
      raising/increasing the switching frequency during a predetermined time period or during a variable time period which ends at a timing when the ripple range of the current flowing through the inductive element becomes smaller than the specific range.

2. The method of claim 1, further comprising:
determining that the ripple range of the current flowing through the inductive element reaches or exceeds above the specific range when a peak-to-peak value of the ripple of the current is greater than a specific threshold.

3. The method of claim 1, wherein the specific range is specified by a first value and a second value which is lower than the first value; the first value is determined as either a maximum current level of an over current protection operation or a tolerable current upper limit which is lower than the maximum current level; and, the second value is determined as either zero or a tolerable current lower limit higher than zero.

4. The method of claim 3, wherein the switching frequency is adjusted when both of a first event and a second event occur during a same duty cycle of the DC/DC power converter; the first event indicates that the current flowing through the inductive element reaches the first value, and the second event indicates that the current flowing through the inductive element reaches the second value.

5. The method of claim 3, wherein the switching frequency is adjusted when both of a first event and a second event occur during different duty cycles of the DC/DC power converter; the first event indicates that the current flowing through the inductive element reaches the first value, and the second event indicates that the current flowing through the inductive element reaches the second value.

6. The method of claim 1, wherein the switching frequency is adjusted to an original frequency when the predetermined time period or the variable time period ends.

7. The method of claim 1, wherein the switching frequency is adjusted in response to a change of an inductance of the inductive element due to a change of external magnetic field.

8. A converter circuit of a DC-to-DC (DC/DC) power converter, comprising:
a switching node used to be coupled to a first end of an inductive element which is externally connected to the DC/DC power converter;
an output sensing node used to be coupled to a second end of the inductive element, wherein an output voltage provided by the DC/DC power converter is generated at the second end of the inductive element through the inductive element;
a pulse-width-modulation (PWM) controller, coupled to the switching node and the output sensing node, for adjusting a switching frequency in response to a specific event that a ripple range of a current flowing through the inductive element reaches or exceeds above a specific range, wherein the specific event is detected by the PWM controller via the switching node and the output sensing node;
wherein the PWM controller raises/increases the switching frequency during a predetermined time period or during a variable time period which ends at a timing when detecting that the ripple range of the current flowing through the inductive element becomes smaller than the specific range.

9. The converter circuit of claim 8, wherein the PWM controller determines that the ripple range of the current flowing through the inductive element reaches or exceeds above the specific range when detecting that a peak-to-peak value of the ripple of the current is greater than a specific threshold.

10. The converter circuit of claim 8, wherein the specific range is specified by a first value and a second value which is lower than the first value; the first value is determined as either a maximum current level of an over current protection operation or a tolerable current upper limit which is lower than the maximum current level; and, the second value is determined as either zero or a tolerable current lower limit higher than zero.

11. The converter circuit of claim 10, wherein the PWM controller adjusts the switching frequency when both of a first event and a second event occur during a same duty cycle of the DC/DC power converter; the first event indicates that the current flowing through the inductive element reaches the first value, and the second event indicates that the current flowing through the inductive element reaches the second value.

12. The converter circuit of claim 10, wherein the PWM controller adjusts the switching frequency when both of a first event and a second event occur during different duty cycles of the DC/DC power converter; the first event indicates that the current flowing through the inductive element reaches the first value, and the second event indicates that the current flowing through the inductive element reaches the second value.

13. The converter circuit of claim 8, wherein the PWM controller is arranged to adjust the switching frequency to an original frequency from an increased frequency when the predetermined time period or the variable time period ends.

14. The converter circuit of claim 8, wherein the switching frequency is adjusted in response to a change of an inductance of the inductive element due to a change of external magnetic field.

15. A pulse-width-modulation (PWM) controller in a converter circuit of a DC-to-DC (DC/DC) power converter, the converter circuit comprising a switching node and an output sensing node, the switching node being used to be coupled to a first end of an inductive element which is externally connected to the DC/DC power converter, the output sensing node being used to be coupled to a second end of the inductive element, an output voltage provided by the DC/DC power converter being generated at the second end of the inductive element through the inductive element;
wherein the PWM controller is coupled to the switching node and the output sensing node and used for adjusting a switching frequency in response to a specific event that a ripple range of a current flowing through the inductive element reaches or exceeds above a specific range, wherein the specific event is detected by the PWM controller via the switching node and the output sensing node; the PWM controller raises/increases the switching frequency during a predetermined time period or during a variable time period which ends at a timing when detecting that the ripple range of the current flowing through the inductive element becomes smaller than the specific range.

16. The PWM controller of claim 15, wherein the PWM controller determines that the ripple range of the current flowing through the inductive element reaches or exceeds above the specific range when detecting that a peak-to-peak value of the ripple of the current is greater than a specific threshold.

17. The PWM controller of claim 15, wherein the specific range is specified by a first value and a second value which is lower than the first value; the first value is determined as either a maximum current level of an over current protection operation or a tolerable current upper limit which is lower than the maximum current level; and, the second value is determined as either zero or a tolerable current lower limit higher than zero.

18. The PWM controller of claim 15, wherein the switching frequency is adjusted in response to a change of an inductance of the inductive element due to a change of external magnetic field.

\* \* \* \* \*